United States Patent [19]

Yamaguchi

[11] Patent Number: 5,282,355

[45] Date of Patent: Feb. 1, 1994

[54] EXHAUST GAS NO$_x$ REMOVAL SYSTEM

[75] Inventor: Tetsuji Yamaguchi, Nagasaki, Japan

[73] Assignee: Mitsubishi Jukogyo Kabushiki Kaisha, Tokyo, Japan

[21] Appl. No.: 938,459

[22] Filed: Sep. 1, 1992

[30] Foreign Application Priority Data

Sep. 2, 1991 [JP] Japan ................. 3-221538

[51] Int. Cl.$^5$ ................................. F02C 7/08
[52] U.S. Cl. ..................... 60/39.5; 60/39.182
[58] Field of Search ............... 60/39.182, 39.5; 122/7 R, 7 B

[56] References Cited

U.S. PATENT DOCUMENTS 4,160,805  7/1979  Inaba et al. ................ 60/39.5
4,466,241  8/1984  Inui et al. ................. 60/39.5

Primary Examiner—Richard A. Bertsch
Assistant Examiner—W. J. Wicker
Attorney, Agent, or Firm—Wenderoth, Lind & Ponack

[57] ABSTRACT

An improved exhaust gas NO$_x$ removal system removes NO$_x$ from exhaust gas through a catalytic reduction process making use of ammonia or its precursor as a reducing agent. The system includes a vaporizer in which ammonia or its precursor is vaporized, and one or a plurality of nozzles provided in a flue upstream of an NO$_x$ removal catalyst layer. The number of nozzles corresponds to a cross-sectional area of the same flue. These nozzles eject the ammonia or its precursor, vaporized by superheated steam within the vaporizer, into the flue. The superheated steam to be used in the vaporizer for evaporating ammonia or its precursor can be taken from the exhaust gas boiler itself in which NO$_x$ removal is to be effected.

12 Claims, 2 Drawing Sheets

EXHAUST GAS NO$_x$ REMOVAL SYSTEM

BACKGROUND OF THE INVENTION

1. Field of the Invention

The present invention relates to an exhaust gas NO$_x$ removal system for removing nitrogen oxides contained in exhaust gas, and more particularly to a NO$_x$ removal system that is well-suited for removing nitrogen oxides contained in exhaust gas discharged from a gas turbine, a diesel engine, a gas engine, a boiler, a heating furnace, a refuse incinerator, an FCC, a chemical reaction process, etc.

2. Description of the Prior Art

An exhaust gas NO$_x$ removal system in the prior art for cleaning combustion exhaust gas discharged from a gas turbine of a gas turbine power generating system will be described with reference to FIGS. 2 and 3. As shown in these figures, fuel 2 and air 3 are charged into a gas turbine 1 and combusted, and the combustion exhaust gas is sent to a flue 4. The exhaust gas in the flue passes through a heat-exchanger 5 for recovering heat of the exhaust gas, which is used to generate steam, and then through an NO$_x$ removal system 6 provided with an ammonia injector. Afterwards, the exhaust gas is dispersed into the atmosphere through a stack 7. The above-mentioned heat-exchanger 5 constitutes a vaporizer, a superheater and the like of an exhaust gas boiler making use of the exhaust gas of the gas turbine 1 as a heat source.

The NO$_x$ removal system 6 provided in the flue 4 is for reducing nitrogen oxides (hereinafter abbreviated as NO$_x$) in the combustion exhaust gas into harmless nitrogen and water through a catalyst by injecting ammonia.

In one known type of the NO$_x$ removal system 6 illustrated in FIG. 2, after aqueous ammonia 8 is evaporated by NO$_x$-free exhaust gas extracted from the flue 4, it is sprayed into the above-mentioned NO$_x$ removal system 6. The NO$_x$-free exhaust gas is extracted from the flue by an exhaust gas recirculation fan 10, and is then introduced to a vaporizer 11. Here, aqueous ammonia is atomized with air or steam 9, and a gaseous mixture of aqueous ammonia and the exhaust gas extracted by the exhaust gas recirculation fan 10, may be injected into the flue 4 upstream of the catalyst layer of the NO$_x$ removal system 6 via an ammonia vapor pipe 12.

In addition, one example of a system in which aqueous ammonia is directly sprayed into an NO$_x$ removal system 6 is shown in FIG. 3. In this figure, spray nozzles 10a are disposed upstream of a catalyst layer in the NO$_x$ removal system 6 disposed within a flue 4. Aqueous ammonia stored in an aqueous ammonia tank 13 is sent under pressure to the spray nozzles 10a by means of a pump 14, whereby the ammonia is sprayed onto the catalyst layer. It is to be noted the reference numeral 15 designates a mixer, and the other elements similar to those shown in FIG. 2 are designated by like reference numerals.

In the case where aqueous ammonia (or its precursor, for instance, aqueous urea) is vaporized by NO$_x$-free exhaust gas and is injected into the flue, since sulfur oxides or a minute amount of nitrogen oxides in the exhaust gas are combined with the ammonia, ammonium sulfate, ammonium acid sulfate or ammonium nitrate in a solid state are produced. Solids of these products would adhere to an orifice by which a flow rate is measured or to a damper provided in the ammonia vapor pipe. To prevent such a problem it is necessary to maintain a high temperature at the outlet of the vaporizer, that is, to sustain a vapor temperature of aqueous ammonia at 200° C. or higher. As a result, it was necessary to extract a large amount of exhaust gas.

In the case of directly dispersing aqueous ammonia into the exhaust gas as shown in FIG. 3, the rate at which the vaporization reaction of liquid occurs is a controlling factor. Because such a reaction takes as long as 0.5–1.0 second, it was necessary to space injection nozzles a large distance from an NO$_x$ removal catalyst, to form a fine spray of ammonia or to provide a mixer for preliminarily mixing the aqueous ammonia with exhaust gas.

SUMMARY OF THE INVENTION

The present invention has been developed in view of the aforementioned status of the prior art, and it is one object of the present invention to provide an NO$_x$ removal system provided with an injection device of ammonia (or its precursor), which can efficiently make NO$_x$ in exhaust gas harmless.

Another object of the present invention is to provide an NO$_x$ removal system constructed in such a manner that aqueous ammonia (or its precursor) may be vaporized efficiently and injected into exhaust gas from which NO$_x$ is to be removed.

Still another object of the present invention is to provide an NO$_x$ removal system which can effectively prevent ammonia compounds from adhering to parts of a system for feeding ammonia (or its precursor) into exhaust gas.

Yet another object of the present invention is to provide an NO$_x$ removal system in which ammonia (or its precursor) can be injected into exhaust gas while it is kept in a condition immediately reactable with nitrogen oxides in the exhaust gas.

According to the present invention, an exhaust gas NO$_x$ removal system for removing nitrogen oxides in exhaust gas through a catalytic reduction process by making use of ammonia or its precursor as a reducing agent, comprises a vaporizer in which ammonia or its precursor is vaporized by means of superheated steam, and one or a plurality of nozzles provided in a flue upstream of an NO$_x$ removal catalyst layer, the number of nozzles corresponding to a cross-sectional area of the flue, and the nozzles ejecting into the flue the ammonia or its precursor which was vaporized by the superheated steam within the vaporizer.

The superheated steam used for vaporizing the ammonia or its precursor within the above-mentioned vaporizer can be extracted while at 200°–600° C. from a passageway through which exhaust gas from which NO$_x$ is to be removed is flowing.

According to the present invention, superheated steam is introduced into a vaporizer, and within the same vaporizer, aqueous ammonia or its precursor (hereinafter generally referred to as "aqueous ammonia") is atomized into fine particles by means of an injection nozzle or nozzles.

This vapor is charged through the injection nozzle or nozzles upstream of an NO$_x$ removing catalyst without causing precipitation of ammonium acid sulfate or the like within an aqueous ammonia vapor pipe. Hence, vapor of aqueous ammonia and the exhaust gas can be mixed efficiently in a short period of time within a flue.

The above-mentioned and other objects, features and advantages of the present invention will become more apparent by referring to the following description of one preferred embodiment of the present invention taken in conjunction with the accompanying drawings.

DETAILED DESCRIPTION OF THE PREFERRED EMBODIMENT

Figure 1:
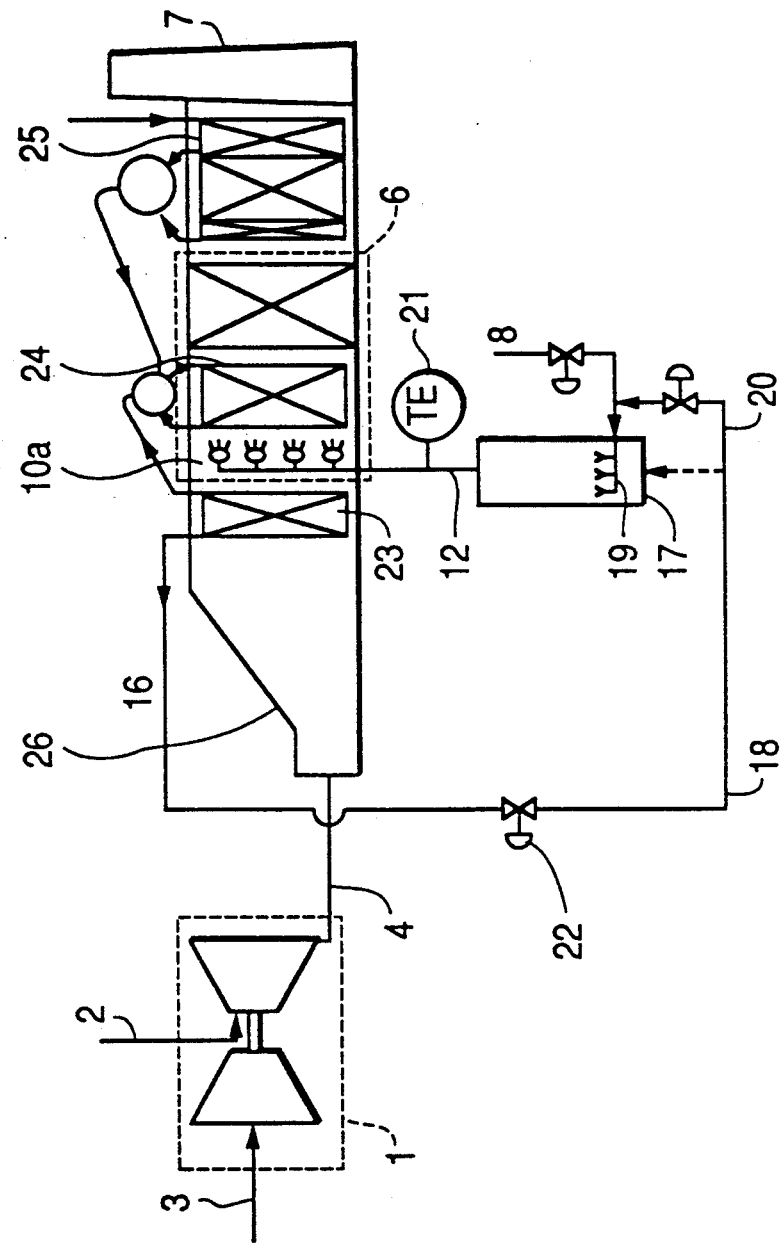
FIG. 1 is a schematic system diagram of one preferred embodiment of an exhaust gas $NO_x$ removal system according to the present invention.
Figure 2:
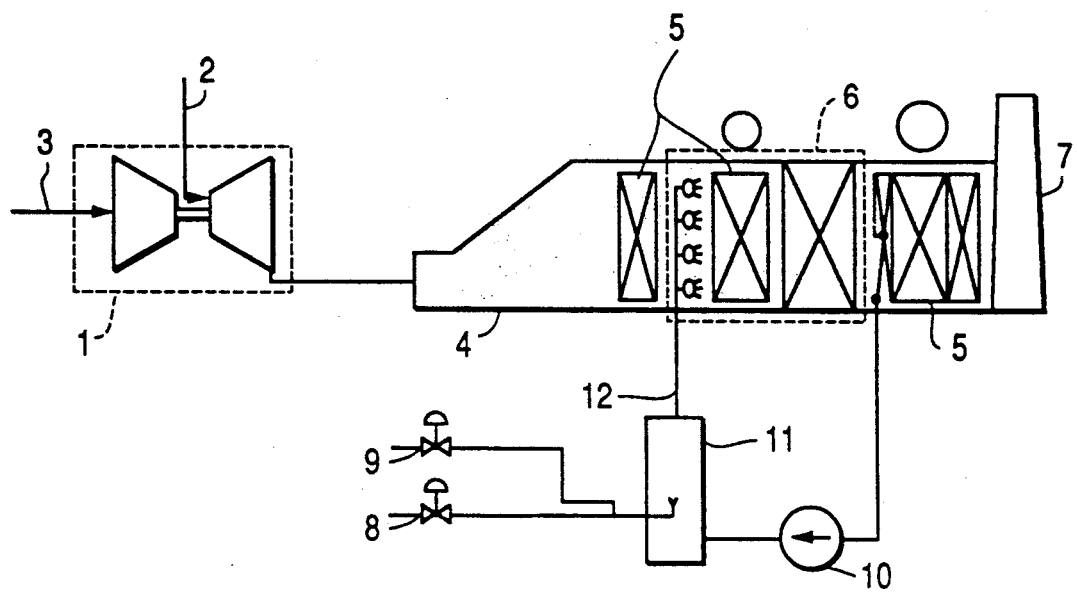
FIG. 2 is a schematic system diagram of one example of the heretofore known exhaust gas $NO_x$ removal systems in the prior art.
Figure 3:
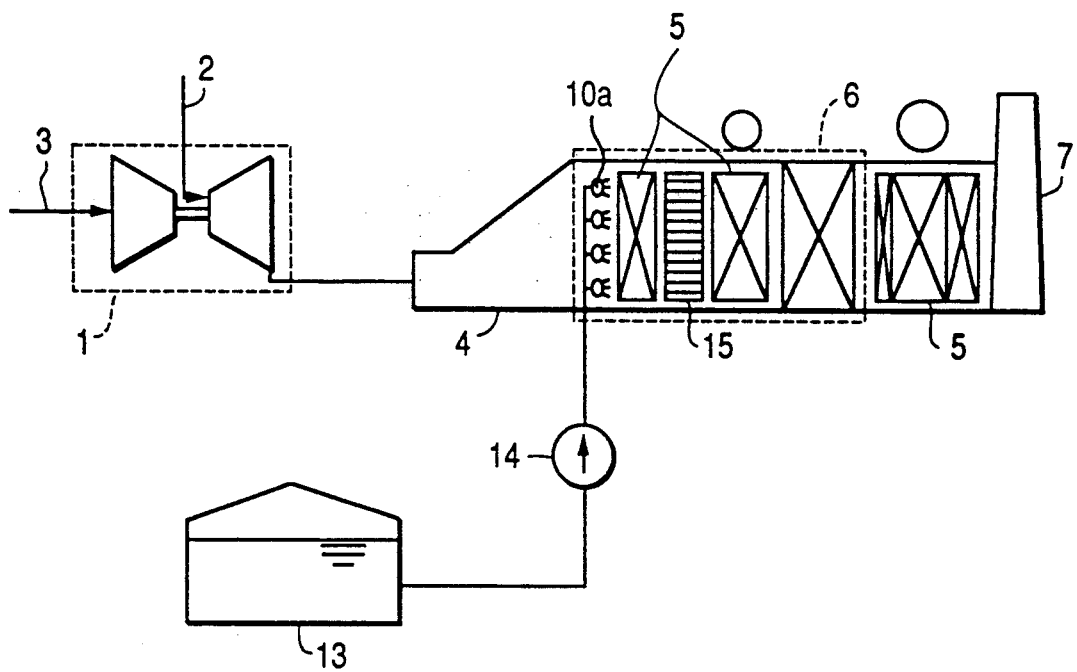
FIG. 3 is a schematic system diagram of another example of the heretofore known exhaust gas $NO_x$ removal systems in the prior art.

One preferred embodiment of the present invention is illustrated in FIG. 1. In this preferred embodiment, the $NO_x$ removal system according to the present invention is applied to an exhaust gas boiler which makes use of exhaust gas of a gas turbine as a heat source. Referring now to FIG. 1, within a flue 4 extending from a gas turbine 1 are disposed a superheated steam pipe 23, a high-temperature heat-exchanger 24 and a low-temperature heat-exchanger 25, which constitute an exhaust gas boiler 26 such as a superheater and a vaporizer.

Also within the flue 4 is an $NO_x$ removal system 6. Between the superheated steam pipe 23 and the high-temperature heat-exchanger 24 are provided nozzles 10a for feeding aqueous ammonia to the $NO_x$ removal system 6. It is to be noted that the $NO_x$ removal system and its nozzles 10a could be located at an optimum position depending upon temperature conditions and the like, and is therefore not limited to the position illustrated in the figure.

Exhaust gas having issued from the gas turbine 1, as the result of the combustion of fuel 2 and air 3 charged into the turbine, is led to the flue 4. Here, an ammonia injection system comprises an extraction pipe 18 through which superheated steam 16 extracted from the superheated steam pipe 23 within the exhaust gas boiler 26 is led to a vaporizer 17, an aqueous ammonia pipe 19 through which aqueous ammonia is fed into the vaporizer 17 by means of steam passing through an atomizing steam pipe 20, and an aqueous ammonia vapor pipe 12 for leading vapor of aqueous ammonia to the nozzles 10a within the flue 4.

More particularly, a portion 16 of the superheated steam at 200°-600° C. is extracted from the boiler 26 and is introduced to the vaporizer 17 via the extraction pipe 18. Within the vaporizer 17 is mounted the aqueous ammonia spray pipe 19. In addition, depending upon a degree of enthalpy possessed by the superheated steam 16, that is, in the case of dealing with low-enthalpy steam, aqueous ammonia 8 is sprayed in a finely atomized state through the media of steam passing through atomizing steam pipe 20.

The temperature of the vapor of aqueous ammonia in the aqueous ammonia vapor pipe 12 at the outlet of the vaporizer 17 is detected by means of a thermometer 21, and a control operation is effected by means of a superheated steam control valve 22 so that the temperature of the vapor is maintained at 130°-150° C. In this way, the formation of vapor from the aqueous ammonia with the superheated steam 16 is sustained.

To this vaporizer 17 is connected the aqueous ammonia vapor pipe 12, which is connected to one or a plurality of ejection nozzles 10a disposed upstream of a catalyst layer in the $NO_x$ removal system 6 within the flue 4. Through these ejection nozzles 10a, vapor of aqueous ammonia is injected in an amount corresponding to the flow rate of $NO_x$ in the exhaust gas, and after the vapor of aqueous ammonia has been efficiently mixed with the exhaust gas uniformly in a short period of time, the gaseous mixture passes through the catalyst layer. At this time, owing to a catalytic reaction with ammonia, $NO_x$ in the exhaust gas can be efficiently reduced into harmless nitrogen and water. It is to be noted that the superheated steam led to the ammonia injection means is not necessarily limited to that derived from the exhaust gas boiler 26, but could be derived from other sources as long as it is at the predetermined necessary temperature and the like.

As will be apparent from the detailed description of the preferred embodiment above, according to the present invention, since steam is used for vaporizing aqueous ammonia, ammonium acid sulfate will not precipitate. Hence, the temperature of the vaporized ammonia piping at the outlet of the vaporizer can be as low as 100-150° C., and also hot gas for vaporization and a fan are since aqueous ammonia is vaporized in a vaporizer outside of a flue and then the vapor is fed into the flue, no time is spent for vaporization within the flue. Hence, a reducing agent (steam of aqueous ammonia) can be ejected even from a location closest to the catalyst in the system, whereby it becomes possible to generate an $NO_x$ removal reaction within a narrow space.

While a principle of the present invention has been described above in connection with one preferred embodiment of the invention, it is intended that all matter contained in the above description and illustrated in the accompanying drawings be interpreted as illustrative of the invention and not in a limiting sense.

What is claimed is:

1. An exhaust gas $NO_x$ removal system comprising: a flue through which exhaust gas containing $NO_x$ is fed; an $NO_x$ removal catalyst in said flue which will initiate a chemical reaction involving $NO_x$ and ammonia or its precursor; a vaporizer connected to a source of aqueous ammonia or its precursor; a vaporizer connected to a source of aqueous ammonia or its precursor; superheated steam piping connected to a source of superheated steam and to said vaporizer, whereby superheated steam is led into the vaporizer through said piping to vaporize ammonia or its precursor in the vaporizer; at least one nozzle disposed in said flue upstream of said $NO_x$ removal catalyst with respect to the direction in which exhaust gas is fed through the flue, each said at least one nozzle being connected to an outlet of said vaporizer, whereby vapor of aqueous ammonia formed in said vaporizer passes to said at least one nozzle and is sprayed into the flue; a thermometer operatively connected to said vaporizer so as to detect the temperature of the vapor of aqueous ammonia passing through the outlet of said vaporizer; and a control valve operatively disposed in said superheated steam piping and operatable to regulate the amount of superheated steam passing through said piping to said vaporizer, whereby said control valve can be operated on the basis of the temperature detected by said thermometer to cause an amount of superheated steam to be introduced to said vaporizer that is sufficient to maintain the temperature of the vapor of the aqueous ammonia within a predetermined range.

2. An exhaust gas $NO_x$ removal system as claimed in claim 1, wherein said flue is connected to a gas turbine.

3. An exhaust gas $NO_x$ removal system as claimed in claim 1, and further comprising an introducing pipe connecting said vaporizer with a source of aqueous ammonia, and extraction piping having one end connected to said superheated steam piping and another end including a first branch connected directly to said vaporizer and a second branch connected directly to said introducing pipe.

4. An exhaust gas $NO_x$ removal system as claimed in claim 1, and further comprising a boiler provided in said flue so as to be heated by the exhaust gas, said superheated steam piping constituting part of said boiler, and extraction piping connecting said superheated steam piping of said boiler to said vaporizer so that part of the superheated steam produced by the boiler is fed to said vaporizer to vaporize the aqueous ammonia.

5. An exhaust gas $NO_x$ removal system as claimed in claim 4, wherein said boiler also comprises a superheater and an evaporator, and each said at least one nozzle is interposed between the superheater and the evaporator of the boiler.

6. An exhaust gas $NO_x$ removal system as claimed in claim 4, wherein said boiler further includes a high-temperature heat exchanger and a low temperature heat exchanger disposed successively in said flue downstream of said superheated steam piping with respect to the direction in which exhaust gas passes through the flue, and said $NO_x$ removal catalyst is disposed between said superheated steam piping and said low temperature heat exchanger.

7. An exhaust gas $NO_x$ removal system comprising: a flue through which exhaust gas containing $NO_x$ is fed; an $NO_x$ removal catalyst in said flue which initiates a chemical reaction involving $NO_x$ and ammonia or its precursor; means for vaporizing aqueous ammonia or its precursor with superheated steam, said means including a vaporizer disposed outside of said flue, a source of superheated steam, extraction piping connecting said vaporizer to the source of superheated steam and an introducing pipe connecting said vaporizer to a source of aqueous ammonia or its precursor; and at least one nozzle disposed in said flue upstream of said $NO_x$ removal catalyst with respect to the direction in which exhaust gas is fed through the flue, each said at least one nozzle being connected to an outlet of said vaporizer, whereby vapor of aqueous ammonia formed in said vaporizer passes to said at least one nozzle and is sprayed into the flue.

8. An exhaust gas $NO_x$ removal system as claimed in claim 7, wherein said flue is connected to a gas turbine.

9. An exhaust gas $NO_x$ removal system as claimed in claim 7, wherein said extraction piping has one end connected to said superheated steam piping and another end including a first branch connected directly to said vaporizer and a second branch connected directly to said introducing pipe.

10. An exhaust gas $NO_x$ removal system as claimed in claim 7, wherein said source of superheated steam is a boiler provided in said flue so as to be heated by the exhaust gas, said boiler including superheated steam piping connected to said extraction piping so that part of superheated steam produced by the boiler is fed to said vaporizer to vaporize the aqueous ammonia.

11. An exhuast gas $NO_x$ removal system as claimed in claim 10, wherein said boiler also comprises a superheater and an evaporator, and each said at least one nozzle is interposed between the superheater and the evaporator of the boiler.

12. An exhaust gas $NO_x$ removal system as claimed in claim 10, wherein said boiler further includes a high-temperature heat exchanger and a low temperature heat exchanger disposed successively in said flue downstream of said superheated steam piping with respect to the direction in which exhaust gas passes through the flue, and said $NO_x$ removal catalyst is disposed between said superheated steam piping and said low temperature heat exchanger.

* * * * *